United States Patent [19]

Boese

[11] 4,294,323

[45] Oct. 13, 1981

[54] CRYOGENIC POWERED VEHICLE

[75] Inventor: Harold L. Boese, Galveston, Tex.

[73] Assignee: Cryogenics Unlimited, Galveston, Tex.

[21] Appl. No.: 75,235

[22] Filed: Sep. 13, 1979

[51] Int. Cl.³ .............................................. B60K 3/02
[52] U.S. Cl. ................................... 180/54 B; 60/668; 165/174; 180/303
[58] Field of Search ...................... 180/54 B, 303, 302, 180/304; 60/651, 671, 668; 165/174, 179; 138/38

[56] References Cited

U.S. PATENT DOCUMENTS

| | | | |
|---|---|---|---|
| 934,572 | 9/1909 | Reis | 138/38 |
| 2,068,955 | 1/1937 | Kritzer et al. | 165/174 |
| 3,565,201 | 2/1971 | Petsinger | 180/54 B |
| 3,681,609 | 8/1972 | Boese et al. | 180/54 B |
| 3,830,326 | 8/1974 | Hartung | 180/303 |
| 3,885,394 | 5/1975 | Witt et al. | 60/651 |
| 4,106,581 | 8/1978 | West et al. | 180/54 B |

*Primary Examiner*—David M. Mitchell
*Attorney, Agent, or Firm*—Harvey B. Jacobson

[57] ABSTRACT

A cryogenic powered vehicle is disclosed which utilizes liquid nitrogen contained in a storage tank or tanks and communicated with a plurality of expansion assemblies through a one-way flow valve with the pressurized expanded gas being discharged to atmosphere through a turbine structure which is drivingly connected to the driving wheels of a vehicle through a suitable transmission and other conventional drive components. The expansion assemblies include heat exchange devices in the form of serpentine tubes having heat exchange fins thereon with one of the expansion assemblies being in the form of a heat exchange coil associated with the air conditioning system of an automobile or the load cooling system of a load carrying vehicle. One of the expansion assemblies is located adjacent the inlet of a turbine and is in the form of a master expander coil to discharge pressurized gas into a rotary vane type turbine to produce a rotational output that is drivingly connected to the drive train of a vehicle.

2 Claims, 4 Drawing Figures

CRYOGENIC POWERED VEHICLE

BACKGROUND OF THE INVENTION

1. Field of the Invention

The present invention generally relates to a system for powering vehicles such as automobiles, trucks or other land vehicles and the like and more particularly relates to the use of a cryogenic liquid gas, preferably liquid nitrogen, combined with heat exchange devices in the form of expansion coil assemblies to absorb heat from the atmosphere, the passenger compartment or load compartment of a vehicle and a gas pressure driven motor or engine, preferably in the form of a rotary vane type turbine, for driving a component of the drive train of a vehicle with the expanded gas being discharged to the atmosphere through a suitable muffler system.

2. Description of the Prior Art

In prior U.S. Pat. Nos. 3,681,609 issued Aug. 1, 1972, 3,842,333 issued Oct. 15, 1974 and 3,870,942 issued Mar. 11, 1975, liquid nitrogen has been used to drive a generator or alternator for producing electrical energy to drive a vehicle with the liquid nitrogen being used to reduce the temperature of various electrical components with the expanded and varporized gas being exhausted to atmosphere through a turbine or the like which drives the generator or alternator. While such devices operate satisfactorily, the electrical components including the batteries and drive motor are relatively expensive and add considerably to the gross weight of a vehicle. The prior patents cited during prosecution of the applications which matured into the above-mentioned patents are also exemplary of the state of development of this art.

SUMMARY OF THE INVENTION

An object of the present invention is to provide a cryogenic powered vehicle utilizing liquid nitrogen stored in vacuum insulated tanks having a gaseous exhaust line with expansion assemblies and a supply line communicated with the liquid nitrogen in the tanks for enabling flow of liquid nitrogen through a one-way flow valve into a manifold supplying a plurality of parallel expanders in the form of heat exchange devices for absorbing heat from the atmosphere for converting the liquid nitrogen to a gaseous state.

Another object of the invention is to provide a power system for a vehicle in accordance with the preceding object in which the nitrogen also communicates with a heat exchange device either in the form of an air conditioning coil of a passenger compartment or a heat exchange device associated with the load compartment of a vehicle to maintain predetermined temperature conditions within the passenger compartment or load compartment.

A further object of the invention is to provide a power system for a vehicle in accordance with the preceding objects which utilizes a rotary van type gas motor which communicates with a master expander or heat exchange assembly which receives gaseous nitrogen at a predetermined pressure and exhausts this gas to atmosphere while driving the rotor of the rotary motor thus producing driving force that is connected to the drive train of a vehicle.

Still another object of the present invention is to provide a cryogenic powered vehicle in accordance with the preceding objects which is simple in construction, easy to install in existing vehicles without major alteration of the drive components except for removal of the existing internal combustion engine and which is effective when installed in existing vehicles or new vehicles and efficiently converts the energy of liquid nitrogen into mechanical output without discharging harmful pollutants into the atmosphere.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
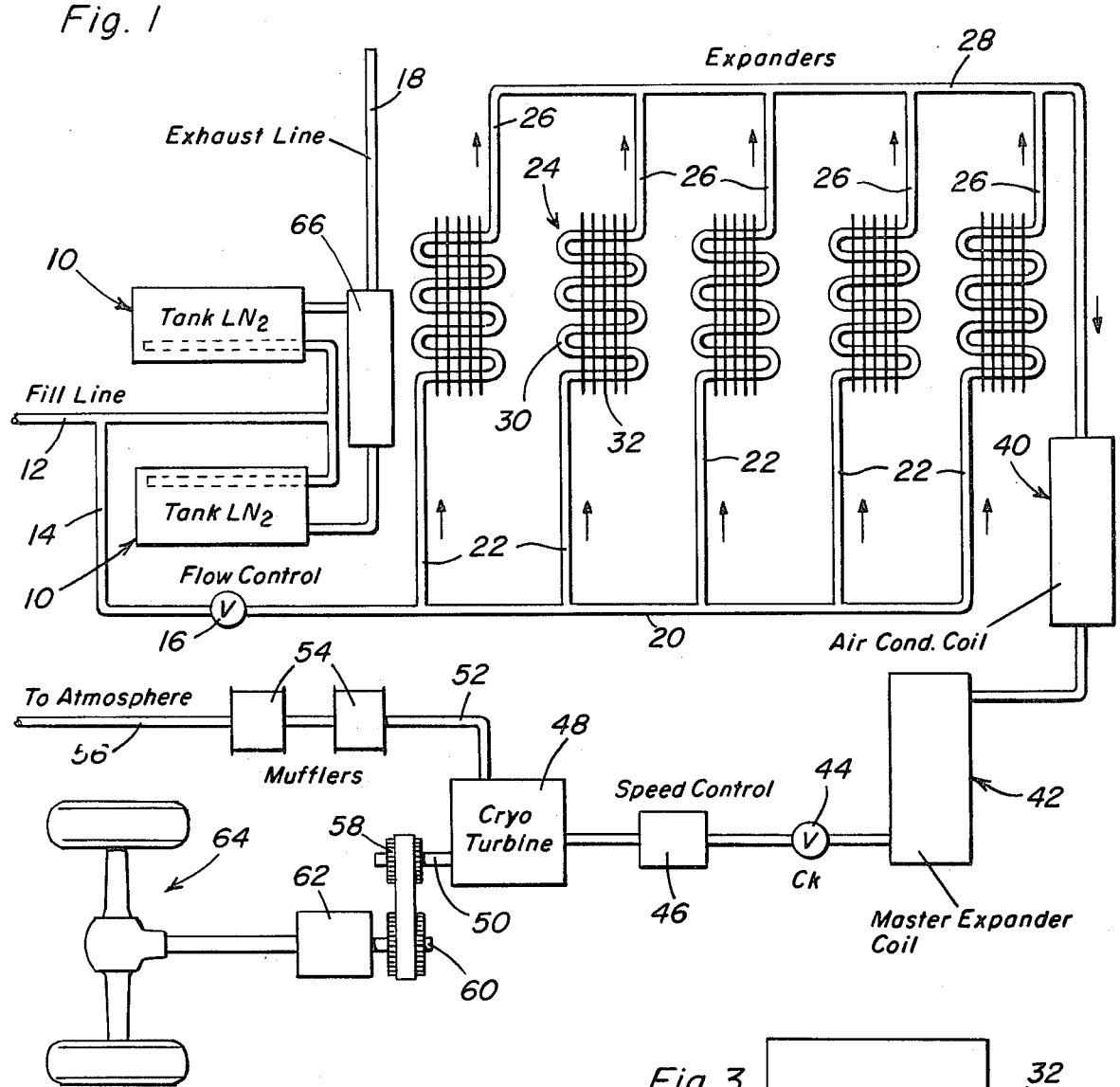
FIG. 1 is a schematic view illustrating the components of the cryogenic powered vehicle of the present invention.
Figure 2:
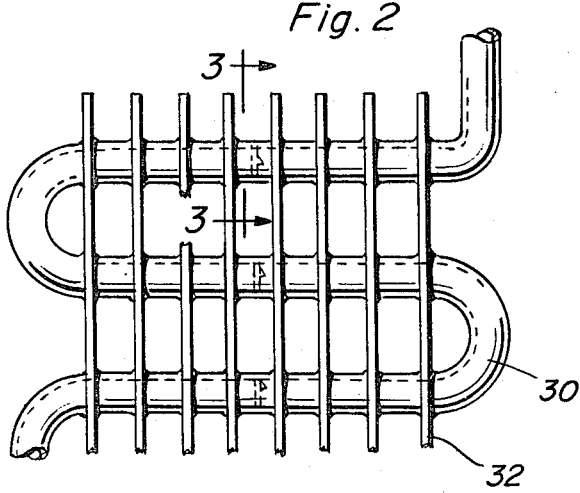
FIG. 2 is an enlarged fragmentary view of a portion of one of the expanders.
Figure 3:
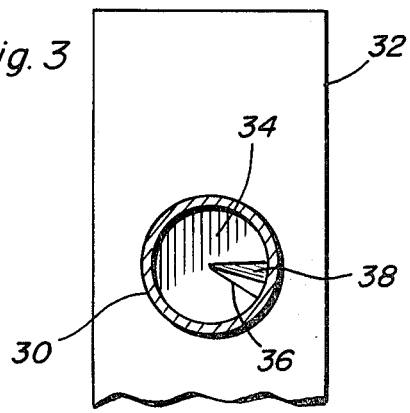
FIG. 3 is a detailed sectional view of one of the expander tubes illustrating the structure of the baffle disposed therein.
Figure 4:
FIG. 4 is a perspective view of one of the baffles.

Referring now specifically to the drawings, FIG. 1 discloses schematically the cryogenic power system for a vehicle such as an automobile, truck or the like. This system includes storage tanks 10 for liquid nitrogen with a fill line 12 being communicated with an upper end thereof and terminating adjacent the lower end thereof so that the open end of the fill line in each of the tanks 10 will normally be adjacent the lower portion of the tank and in communication with liquid nitrogen in the tanks. A supply line 14 communicates with the fill line and thus is also in communication with liquid nitrogen within the tanks 10. The supply line 14 is provided with a flow control valve 16 which is a one-way valve to permit flow from the tanks 10 but prevents flow of gaseous nitrogen back into the tanks 10. An exhaust line 18 is communicated with the upper end or gaseous portions of the tanks 10 to bleed gaseous nitrogen from the tanks 10 during refill of the tanks 10 with liquid nitrogen. The tanks 10 are vacuum insulated and the liquid nitrogen generally is maintained under approximately 150 lbs. per square inch pressure at minus 320.4° F. The capacity of the tanks may vary but in one installation, the tanks have been provided with a capacity of 15 gallons and are conventional and commercially available vacuum insulated tanks.

The supply line 14 is in communication with a manifold 20 through the one-way valve and the manifold 20 is in communication with a plurality of parallel flow lines 22 each of which communicates with an expansion assembly or expander 24 which in turn communicate with parallel lines 26 extending to and communicating with a manifold 28. Each of the expanders 24 includes a serpentine tube 30 having heat transfer fins 32 mounted thereon in a conventional manner with the tube and fin arrangement being generally in the form of a conventional heat exchange coil of the tube and fin type with the length and orientation of the tube and fins being variable in order to absorb heat from the atmosphere. If desired or necessary depending upon the installational conditions, a fan may be associated with the expanders 24 to circulate ambient air over the fins 32. In order to enhance the heat exchange contact between the liquid nitrogen within the tube 30 and the surface of the tube 30, a plurality of baffles 34 are disposed in the tube 30 with each of the baffles including an opening 36 defined by a struck out blade 38 that extends radially to the center of the baffle 34 and which is struck axially in a manner to cause the liquid or gaseous material flowing through the tube 30 to move in a circular or spiral path. The openings 36 and the blades 38 are staggered in relation to each other to maintain the spiral flow of the material through the tube 30 to provide good heat exchange contact between the surface of the tube 30 and the material flowing therethrough.

From the manifold 28, the gaseous nitrogen passes through a heat exchanger generally designated by numeral 40 in the form of an air conditioner coil such as used to control the temperature in a passenger compartment, load compartment or the like of a vehicle. Suitable controls are provided to control the flow through the heat exchanger 40 or bypass the heat exchanger 40 to maintain desired temperature conditions within the passenger compartment or load compartment. From the heat exchanger 40, the gaseous nitrogen passes through a master expander coil 42 similar to the expanders 24 of a higher heat exchange capacity and with larger tube or tubes for passage of the gaseous nitrogen. From the master expander, the nitrogen passes through a pop-off or pressure relief valve 44, a speed control device 46 in the form of a valve connected with an accelerator pedal or other throttle control for the vehicle with the gaseous nitrogen then being introduced into a turbine 48 having a power output shaft 50 and a discharge line 52 passing through muffler assemblies 54 for discharge to atmosphere through discharge line 56. The mufflers may be multiple or single and of conventional construction and the output shaft 50 is provided with a gear or pulley 58 connected to an input shaft 60 of a component of a drive train such as a transmission 62 which may be manual or automatic and connected to a drive shaft, differential and wheel assemblies generally designated by numeral 64 which represent conventional vehicle drive components. The turbine 48 is powered by nitrogen gas pressure and includes an eccentric rotor with a plurality of radial vanes on the rotor engaging the interior of the casing with the specific structure of the turbine itself being conventional although the rotor is provided with passageways to introduce gaseous pressure under the vanes to maintain them in their outward position against the interior of the rotor housing.

The exhaust line 18 is provided with a double expander coil 66 in the line which interconnects the gaseous ends of the tank 10 thus providing two separate expander coils which are connected into a single exhaust line 18 as illustrated. The expansion coil 66 provides three separate functions. As set forth previously, when the tanks 10 are being refilled from the bottom fill line 12, the exhaust line 18 bleeds off gaseous nitrogen from the top of the tanks to atmosphere through an open pipe 18 thereby enabling complete refill of the tanks with liquid nitrogen.

Also, during operation, when the exhaust pipe 18 is normally closed by conventional means, the closing of the speed control valve 46 or partial closing thereof results in a pressure build up in the system which causes a mixture of liquid and gas to return to the tanks 10 and reliquefy with the expander coil 66 then serving as an expansion tank. Likewise, the expander coil 66 serves to equalize the pressure between the tanks 10 during operation.

The pressure relief valve 44 is set at approximately 125 lbs. per square inch with the system pressure being generally maintained at 120 lbs. per square inch. Nitrogen gas will enter the turbine at this pressure and at approximately 70° F. and will exit from the expanders 24 at approximately 50° F. with the increase in temperature being obtained through the air conditioning coil and the master expander coil. In a typical installation, the existing internal combustion engine was removed from a compact vehicle and the present system substituted therefor with the output shaft 50 being connected to the input of the existing automatic transmission through a non-slip geared belt drive and the performance of the vehicle insofar as acceleration and range were substantially the same as was the miles per gallon. However, substantial advantages resulted from a reduction in the cost per gallon of the crygenic liquid and emission from the vehicle was pollution free. Also, liquid nitrogen is now available in many locations due to its use in refrigeration systems for load carrying vehicles. For example, many truck service stations and the like maintain a supply of liquid nitrogen thus rendering this power system practical for use by vehicle operators.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A cryogenic powered vehicle comprising insulated supply tank means for cryogenic liquid, a supply manifold communicated with the supply tank means, a one-way valve between the manifold and supply tank means, a plurality of heat absorbing expansion assemblies each having an inlet communicated directly with the supply manifold, a discharge manifold, each heat absorbing expansion assembly having an outlet communicating directly with the discharge manifold, a master expansion assembly communicating with the discharge manifold, a pressurized gas driven motor communicated with the master expansion assembly for imparting driving force to an output shaft, means communicating with the motor to discharge expanded gas to atmosphere and means directly and mechanically connecting the output shaft of the motor to the drive train of a vehicle, each of the heat absorbing expansion assemblies including a serpentine tube through which cryogenic fluid passes, heat exchange fins secured to the tube and baffle means in the tube to provide a spiral flow path to the fluid material to assure heat exchange contact between the material and the tube for absorbing heat from ambient air, said supply tank means including a pair of tanks for liquid nitrogen having a filler line extending to the lower portion thereof, an exhaust line communicated with each of the gaseous upper portions of the tanks, an exhaust expansion assembly connected with the exhaust lines from the tanks and an opened exhaust pipe connected to the exhaust expansion assembly for bleeding gaseous portions of the cryogenic fluid from upper portions of the tanks during refill thereby enabling the tanks to be completely refilled with liquid nitrogen.

2. The structure as defined in claim 1 wherein each of said baffle means includes a transverse plate forming a barrier in the tube and having a radial opening therein with one edge defined by an inclined blade to impart a spiral flow path to fluid passing through the opening, a heat exchange coil interposed between the plurality of expansion assemblies and the master expansion assembly for controlling temperature in a passenger compartment or load compartment of a vehicle, a speed control means interposed between the master expansion assembly and motor for controlling the output speed of the motor output, and a pressure relief valve between the speed control means and master expansion assembly to maintain pressure in the system below a predetermined maximum.

* * * * *